United States Patent Office 3,475,205
Patented Oct. 28, 1969

3,475,205
METHOD AND COMPOSITION FOR REDUCING SLIPPAGE AND SKIDDING OF RUBBER SURFACES ON ICE
J. Harold Byers, 4627 Verplanck Place NW., Washington, D.C. 20016
No Drawing. Continuation-in-part of application Ser. No. 404,903, Oct. 19, 1964. This application Mar. 26, 1968, Ser. No. 715,945
Int. Cl. C23c 7/00; B32b 25/00; B44d 1/094
U.S. Cl. 117—139                                                6 Claims

ABSTRACT OF THE DISCLOSURE

The present disclosure relates to compositions of matter which have unusual anti-skid properties. The purpose of these compositions is to prevent skidding and sliding of rubber treads on ice surfaces. Mainly useful when streets and sidewalks are covered with frozen ice and snow, these compositions increase the traction of tire treads and shoe soles. These compositions are to be applied to tread surfaces by swabbing or spraying. The compositions comprise a vehicle and an anti-skid agent dissolved or suspended therein. It is found that sulfur, solenium, manganese dioxide, and finely divided metallic zinc are among substances particularly effective as anti-skid agents.

---

This application is a continuation-in-part of application Ser. No. 404,903, filed Oct. 19, 1964, now abandoned, which was a continuation-in-part of application Ser. No. 165,241 filed Jan. 9, 1962, now abandoned, which was a continuation-in-part of application Ser. No. 95,463, filed Mar. 14, 1961, now abandoned.

Attempts have long been made to reduce the rate of accidents caused by slippery icy roads and sidewalks, that prevail in many areas in winter, using traction-increasing means. This purpose has been accomplished by the use of tire chains, by the use of traction-increasing tape for shoe soles, by the spreading of sand on tracks, roads, footways and steps. All of these means are to some degree and usually temporarily useful. Tire chains wear and break tires loaded with gritty materials. Sand and salt on icy road surfaces are dissipated by natural forces. The generally short life of these expedients however does not constitute a serious drawback, when it is considered that the need for use ordinarily exists for only a short time. In temperature climates hazard usually exists for only short periods and in limited areas.

But there is a lack of means for effective use when and where loss of traction is encoutered, which is quickly and easily applied, and adequate for road emergencies.

In the work that has been done and the studies that have been made in the area of road safety under icy winter conditions, an omission consists in the almost negligible attention that has been accorded to variations in the anti-skid properties of various substances.

The prior art seems to have assumed that the function of an anti-skid agent is purely mechanical, i.e. the action of sand or the like is simply to abrade or cut into the ice surface. As with chains, studs and the like, the use of a soft substance is excluded by prevailing preconceptions and suppositions.

By the present conception there is suggested a further field of exploration in the field of relationship between chemical properties and traction effect. This became particularly noteworthy when it was found, in connection with the present investigation, that a material having a hardness in the range of that of ice itself exhibited a traction-increasing effect above that of numerous much harder substances.

In accordance with this conception, compositions were tested as follows: various compositions were prepared and applied to rubber patches of 1 square inch area. These patches were then placed under a pressure of 20 pounds to the square inch, while in contact with a smooth icy surface, and the force required to slide the coated patches observed.

The manner of preparation and application involved merely first coating each rubber patch with an ordinary commercial rubber cement, then sprinkling on the thus formed sticky surface, a lightly spread layer of the substance in question. Pressure was applied in a direction normal to the horizontal and sliding force was applied in horizontal direction.

The differences noted varied in the extreme. There was no need to apply vernier measurements to demonstrate the existence of surprisingly different gripping power or traction qualities found in various substances.

Results of tests under above described conditions are as follows:

| Substance: | Traction |
|---|---|
| Sulphur | Good |
| Zinc dust | Excellent |
| Asbestos | Fair |
| Selenium | Good |
| Aluminum powder | Fair |
| Fuller's earth | Poor |
| Copper oxide | Bad |
| Antimony powder | Poor |
| Silicic acid | Good |
| Boric acid | Poor |
| Charcoal | Fair |
| Powdered iron | Poor |
| Manganese dioxide | Excellent |
| Calcium carbonate | Poor |

The substance, sulfur, was particularly interesting. Although sulfur has a hardness approaching that of ice itself, it performed far better than substances having greater hardness with respect to ice.

In addition, sulfur has properties that that adapt it to subject purpose, to an unusual degree. For example, sulfur is soluble, which property renders it an ideal substance from the standpoint of mechanical application. Solutions of sulfur can be easily swabbed, sprayed or poured on tread surfaces. Solvents available includes ones which are more volatile than water, which are harmless to rubber, and which are compatible in rubber-adhesive compositions. The softness of free sulfur moreover renders it harmless to automobile tires and other rubber bodies, in comparison with the destructive action of hard particle inclusions which have hitherto been suggested and which have been discarded as impractical in actual use.

The tractability of sulfur as to handling in form of solution over substances which are commonly insoluble is a distinct advantage. The sulfur precipitates and quickly forms a crystalline deposit. These sulfur crystals have a property of self-adherence to rubber in that they cling and do not readily rub off the tread surface of a rubber tire or from the rubber sole of a shoe or rubber boot, the incorporation of an additional adhesive agent or adhesive promoting substance, therefore not essential, although it may be desirable. Given the discovery of the action of sulfur in accordance with the present invention, it was confirmed that the action of selenium was comparable.

A considerable discussion of the prior art and further information presented in the parent application specified herein has not been expressly set out in the present specification and this material is hereby incorporated in this application by reference.

In accordance with the present invention it has been found that elemental sulfur, elemental selenium, metallic zinc, and manganese dioxide have the capacity to diminish slipping of tires and footwear on ice.

The aforesaid and other reasons, sulfur is the preferred embodiment. In respect to sulfur it is noteworthy that sulfur has a hardness of 1.5 to 2.5 (Moh's scale) whereas ice has a hardness of 1.5. Thus considered, the hardness of ice is within the range of that of sulfur.

Whereas numerous solvents for sulfur are known to the art, carbon disulfide is preferred.

It has been found that sulfur particles cling with tenacity to rubber surfaces when applied in the form of a solution in carbon disulfide when the solvent has been permitted to evaporate. The solvent eveporates rapidly and there is laid down upon the tire or other rubber surface a thin coating of sulfur in the form of crystalline particles. These, to a very pronounced degree, increase the traction of the rubber surface in contact with an icy surface.

It is possible that the carbon disulfide has a slight dissolving effect on the rubber tread surface and that this solution, on evaporation of the solvent, acts to an extent as an adhesive agent for the layer of small sulfur crystals on the surface of the tire. However explained, the fact is that a fine particle sulfur surface film is deposited on the tread, that this film is tenacious, and that the so treated tire is skid-resistant.

The amount of sulfur dissolved in the solvent is not critical. Given the object of creating on the surface of a tire or a rubber shoe sole, a distribution of sulfur particles, whereas a very light "coating" or layer of particles would be less effective than a very heavy coating, and in this view an optimum amount of distributed sulfur particles should be applied, at the same time even a light coating of the fine sulfur particles has an appreciable effect.

In accordance with the present invention it is not necessary to measure out the sulfur with a metering device, but simply to provide a composition that the owner or operator of the vehicle may use as stated or that he may apply to the soles of his shoes, the composition being in such form that he himself can readily apply the material in such amounts as he may deem desirable.

Taking account of the intended purpose, a substantially saturated solution of sulfur would have certain advantages over a dilute solution. If the amount of sulfur approaches the maximum that the solvent can retain, it follows that the amount of solvent which will be consumed in the course of the applying of the material, will approach a minimum. From the standpoint of economy therefore and other practical considerations, a preferred composition corresponding to the invention would be made up as follows:

Carbon disulfide—6 ounces.
Sulfur (sublimed) dissolved to saturation.

The solution is prepared by mixing the sulfur and carbon disulfide and with occasional stirring permitting the sulfur to therein dissolve, the mixture meanwhile being hold at room temperature.

ROAD TEST

A passenger automobile having tires with comparatively smooth treads was driven in an attempt to ascend an outdoor ice-glazed inclined driveway. It was found that the wheels of the car spun on the ice-glazed surface wherefor it was impossible to back the car up the sloping driveway. Shortly after this attempt, a portion of the sulfur solution prepared in accordance with the preceding example, was spread on the surface of the rear tires of the automobile, and permitted to dry thereon. The carbon disulfide quickly evaporated leaving a visible residue on the tire tread of fine yellow particles. Immediately thereafter a second attempt was made to drive the car up the same ice-glazed slope, and this time it was found that the tires gripped the ice firmly with substantially no tendency whatever to slide or slip. The car was backed up the driveway, and thereafter driven on the adjoining road.

The sulfur component intermixed with the carbon disulfide in accordance with the foregoing example was flowers of sulfur. However any form of elemental sulfur may be used, practical considerations solely suggesting the use of forms which have good solubility and which are available at low cost.

While carbon disulfide is a preferred solvent in accordance with the present invention, other solvents that will dissolve sulfur and which will vaporize at ordinary temperatures may be used, such as benzene, toluene, ether, acetone and chloroform. Whereas solvents such as liquid ammonia or Freon may be used, these would require special means of application. Further examples are set forth below.

Another method whereby sulfur may be applied to the surface of a tire tread or the like rubber tread, involves the use of an adhesive agent. In this embodiment the traction agent may or may not be incorporated in the adhesive. The method may involve simply the steps, first of applying a rubber-bonding adhesive to the surface of the tire; and second, before the adhesive has an opportunity to dry, dusting thereon a finely divided form of sulfur such as flowers of sulfur.

For this purpose any available rubber-bonding adhesive may be used. By the term, rubber-bonding, as herein used, reference is had to a material that will bond rubber to other bodies.

Many adhesive substances that correspond to this definition are known and available. The terminology herein in this respect is perhaps not that of organic chemists, but is the language of those skilled in the art. For example, the term "rubber cement" is meaningful to a man skilled in the art. He does not need to know, and in most cases does not know, the chemical composition of the rubber cement. He only knows that it is a cement that will bond rubber to rubber, or rubber to other substances. In considering the present invention it is clear that what is required is the ability to unite tread surfaces with sulfur particles, and further that the union which is effected need be merely a practical one, and not anything phenomenal such as outwearing the life of the tire itself. In order to keep the terminology herein within the bounds of the art, the term "adhesive" hereby is equated with "cement." Adhesives containing rubber will be referred to as rubber-containing adhesives or, rubber-containing cements, whereas adhesives or cements which bond rubber will be designated as rubber-bonding adhesives. These terms are not mutually exclusive, inasmuch as certain rubber-bonding adhesives contain rubber, while others do not. On the other hand, all rubber-containing adhesives adhere to rubber although some are designed for other purposes.

The term "rubber" is well established in the art and includes both the natural and the synthetic products. The meaning of the term has expanded with time and progress. The chemical arts have made available to other technical arts a number of elastomers which approach the chemical and physical properties of natural rubber hydrocarbons.

Since 1930 a wide range of substances similar to natural rubber in chemical structure and in physical and chemical properties have been synthesized and made available. The collective term "elastomer" was introduced in 1935 by Professor H. L. Fisher (Chemistry of Natural and Synthetic Rubbers by H. L. Fisher, published 1957 by Reinhold Publishing Corp.) but the term "synthetic rubbers" nonetheless survives in the very title and chapters of Professor Fisher's book. The term "rubber" as herein used and defined includes both synthetic and natural rubbers.

There are a wide number of solventh that are useful in connection with making up rubber solutions. These include carbon disulfide, petroleum naphtha, toluol, xylel, benzene, hexane, normal butyl acetate, butyl ether, carbon tetrachloride, cyclohexane, cyclohexanol, ethylene dichloride, isopropyl acetate and many others. (Compounding Ingredients of Rubber, second edition, 1947, Bill Brothers Publishing Corporation; Introduction to Rubber Technology by Maurice Morton, Reinhold Publishing Company, 1959.)

The following are adhesives suitable in the practice of the present invention.

I. This may be prepared by dissolving natural rubber in carbon disulfide. The dissolution of the rubber may be aided by melting the rubber in small pieces and dissolving same in the carbon disulfide, to make a thin syrup. Other cements suitable in the practice of the invention may be found in the Handbook of Chemistry and Physics, twelfth edition, page 939.

II. A suitable cement may be made up having the following composition:

| | Parts |
|---|---|
| Unvulcanized natural rubber | 100 |
| Rosin | 10 |
| Shellac | 8 |

Carbon disulfide, enough to dissolve the foregoing and make a solution of easily spreadable consistency.

III. Another example of a suitable composition is as follows:

| | Parts |
|---|---|
| Gutta percha | 10 |
| Asphaltum | 1 |

Dissolve the foregoing in a mixture of equal parts of carbon disulfide and carbon tetrachloride, using enough of the solvent to make a solution of spreadable consistency.

IV. Another example is as follows:

| | Parts by weight |
|---|---|
| Rubber | 6 |
| Rosin | 2.5 |
| Benzol | 120 |
| Zinc-dimethyl-dithiocarbonate | 1.5 |

V. Rubber, either crude, refined, or reclaimed may be dissolved in gasoline and then dispersed in water in colloidal form.

VI. Rubber in the latex state, containing ammonia as a preservative.

Using the above Example I composition, same may be spread on the tread surface, then dusted with flowers of sulfur and permitted to dry. The tread surface now will be found to be of greatly increased traction when in contact with icy surfaces.

Whereas, as above described, the sulfur may be applied in the form either of (a) a simple solution containing no adhesive component, or (b) a dry powder dusted over a surface which has been prepared by wetting with an adhesive, a preferred form of the invention involves the application to the surface of the tread of a composition containing (1) sulfur, (2) rubber, and (3) a substance that is a solvent for both sulfur and rubber. In this embodiment a composition having the following makeup is suitable:

VII.

| | Parts by weight |
|---|---|
| Sulfur | 100 |
| Rubber (natural, unvulcanized) | 50 |
| Carbon disulfide | 320 |

A convenient method of preparation is to divide the carbon disulfide into two equal parts. To one part the sulfur is added and brought into solution, and to the other part the rubber is added and brought into solution. The two solutions are the commingled.

The foregoing composition may be spread on the tread surface and then, as the carbon disulfide evaporates, will throw down a layer of fine particles of crystalline sulfur. It then will be found that the so treated tread surface will have a traction coefficient against ice many times that of a like surface not so treated.

The amount of sulfur present in the composition may vary widely. In general it must be sufficient to crystallize out in the form of elemental sulfur when the composition is spread on a surface and exposed to the air. In this view there must be more sulfur present in the composition than will form a complex with the rubber or equivalent therein. A very suitable composition may be made up by dissolving all the sulfur in carbon disulfide that the latter will take up at room temperature, and then adding sufficient rubber or prepared rubber cement to give the mixture adhesive properties. Normally the amount of sulfur should exceed the amount of ⅓ of the bonding agent and should not exceed the amount that can be held in true solution in the composition.

If desired a drying agent such as calcium chloride or calcium sulfate may be incorporated in the mixture although it is preferred to omit these components.

Similar compositions may be made up replacing the sulfur with selenium or by use of either zinc dust or manganese dioxide. Manifestly the latter compositions will not have the advantage of forming a true solution. The terms "dispersed," "dispersion" and "dispersed form" are herein used to signify the state of matter ranging from true solution to suspension.

In use the composition may be applied to tires, rubber overshoes, or any other rubber or like surfaces where improvements of the gripping surface action is desired.

Having now, for purposes of better understanding of the invention, its advantages and mode of practice, described certain preferred embodiments thereof, what is claimed is as follows.

I claim:
1. A method of reducing slipping and skidding of tires and rubber footwear on icy surfaces, which comprises:
coating the tread surface thereof with a solution consisting essentially of a substance selected from the group consisting of sulfur and selenium and a solvent for said substance,
said solvent having a volatility greater than the volatility of water,
and permitting said solution to dry on said tread surface,
the amount of said substance thus applied being sufficient to reduce the slipping and skidding of said tires and rubber footwear on icy surfaces.

2. A method according to claim 1 wherein said solvent is carbon disulfide.

3. A method according to claim 1 wherein said substance is sulfur.

4. A liquid coating composition for reducing slipping and skidding of rubber surfaces particularly of tires and footwear on icy surfaces, said composition consisting essentially of: as a traction-increasing component finely divided metallic zinc, and a rubber-bonding adhesive agent, the proportion of said metallic zinc being sufficient when in the form of fine particles to form a discrete coating on said rubber surfaces, and the proportion of said rubber-bonding adhesive being sufficient to bond particles of said metallic zinc to said rubber surfaces.

5. A liquid coating composition for reducing slipping and skidding of rubber surfaces particularly of tires and footwear on icy surfaces, said composition consisting essentially of: as a traction-increasing component finely divided manganese dioxide, a rubber-bonding adhesive agent, the proportion of said manganese dioxide being sufficient when in the form of fine particles to form a coating on said rubber surfaces, and the proportion of said rubber-bonding adhesive being sufficient to bond particles of said manganese dioxide to said rubber surfaces.

6. A method of reducing slipping and skidding of tires and rubber footwear on icy surfaces, which comprises: coating the tread surfaces thereof with a solution consisting essentially of sulfur and carbon disulfide and permitting said solution to dry, the amount of sulfur thus applied being sufficient to reduce the slipperiness and skidding of said tires and rubber footwear.

References Cited

UNITED STATES PATENTS

| | | | |
|---|---|---|---|
| 285,980 | 10/1883 | Doud | 260—760 |
| 1,392,240 | 3/1918 | Walch | 260—751 |
| 1,395,413 | 11/1921 | Hoffman et al. | 260—758 |
| 1,409,418 | 3/1922 | Shawger | 156—96 |
| 1,451,711 | 4/1923 | Pratt | 260—760 |
| 1,516,598 | 11/1924 | Griffiths | 264—130 |
| 1,603,320 | 10/1926 | Conroy et al. | 161—239 X |
| 1,781,492 | 11/1930 | Boughton | 260—774 X |
| 1,824,815 | 9/1931 | Fuchs | 291—1 |
| 1,866,287 | 7/1932 | Blume | 260—760 |
| 1,896,659 | 2/1933 | Bigger | 117—139 |
| 1,943,424 | 1/1934 | Dunfield | 260—760 |
| 1,978,301 | 10/1934 | Fisher | 152—211 X |
| 1,998,892 | 4/1935 | Braden | 260—762 |
| 2,014,438 | 9/1935 | Leach | 18—48 |
| 2,060,576 | 11/1936 | Kauffman | 117—139 |
| 2,204,466 | 6/1940 | Barnes | 117—139 |
| 2,251,220 | 7/1941 | Campbell | 260—759 |
| 2,297,871 | 10/1942 | Campbell | 260—760 |
| 2,304,678 | 12/1942 | Bush | 260—739 |
| 2,386,213 | 10/1945 | Griffith | 260—774 X |
| 2,428,478 | 10/1947 | Thurber | 252—29 |
| 2,622,044 | 8/1949 | Martens | 117—139 |
| 2,643,202 | 8/1950 | Barton | 117—139 |
| 2,675,047 | 4/1954 | Andy | 152—211 |
| 2,862,817 | 12/1958 | Meyer et al. | 96—1.5 |
| 2,933,337 | 4/1960 | Katz | 117—139 X |

FOREIGN PATENTS

| | | |
|---|---|---|
| 1,382 | 4/1879 | Great Britain. |
| 16,691 | 2/1906 | Great Britain. |
| 395,214 | 7/1933 | Great Britain. |

OTHER REFERENCES

The Technology of Adhesives, Delmonte, Reinhold, New York, 1947, pp. 185-6 relied on.

WILLIAM D. MARTIN, Primary Examiner

E. J. CABIC, Assistant Examiner

U.S. Cl. X.R.

51—299; 10—36; 117—33, 169; 260—41, 41.5, 760, 762, 765